(12) United States Patent
Woltmann et al.

(10) Patent No.: US 7,350,756 B2
(45) Date of Patent: Apr. 1, 2008

(54) FASTENER

(75) Inventors: Klaus Woltmann, Demarest, NJ (US); Jonathan Willinger, Tenafly, NJ (US)

(73) Assignee: JW Pet Company, Inc., Teterboro, NJ (US)

(*) Notice: Subject to any disclaimer, the term of this patent is extended or adjusted under 35 U.S.C. 154(b) by 213 days.

(21) Appl. No.: 11/191,732

(22) Filed: Jul. 28, 2005

(65) Prior Publication Data
US 2006/0254030 A1    Nov. 16, 2006

Related U.S. Application Data

(63) Continuation-in-part of application No. 29/229,612, filed on May 10, 2005, now Pat. No. Des. 531,889.

(51) Int. Cl.
*F16B 45/00*     (2006.01)

(52) U.S. Cl. .................. 248/303; 24/548; 24/549; 24/550; 24/547; 24/546; 248/302; 248/304

(58) Field of Classification Search ............. None
See application file for complete search history.

(56) References Cited

U.S. PATENT DOCUMENTS

| | | | |
|---|---|---|---|
| D27,073 S | 5/1897 | Frantz | |
| 818,972 A | * 4/1906 | Lumis | ............. 2/154 |
| D249,020 S | 8/1978 | Raniero | |
| 4,123,900 A | * 11/1978 | Sadowski | ........ 59/83 |
| D272,518 S | 2/1984 | Smith | |
| D273,176 S | 3/1984 | Abbott | |
| D280,596 S | 9/1985 | Keeler | |
| D330,669 S | 11/1992 | Hui-Chuan | |
| D358,083 S | 5/1995 | Pate | |
| D421,712 S | 3/2000 | Brown et al. | |
| D431,181 S | 9/2000 | Leitzke et al. | |
| D432,264 S | 10/2000 | Nicol | |
| D432,905 S | 10/2000 | Sutker et al. | |
| D442,849 S | 5/2001 | Thomas | |
| D452,812 S | 1/2002 | Thomas | |
| D455,334 S | 4/2002 | Ivankovic | |
| D457,420 S | 5/2002 | Kalat | |
| D466,791 S | 12/2002 | Kelleghan | |
| D469,682 S | 2/2003 | Gary et al. | |
| D469,683 S | 2/2003 | Votruba et al. | |
| D481,296 S | 10/2003 | Chen | |
| D481,927 S | 11/2003 | Wu | |
| D492,890 S | 7/2004 | Adams | |
| D495,242 S | 8/2004 | Kucera et al. | |
| D504,306 S | 4/2005 | Chisolm | |

* cited by examiner

*Primary Examiner*—Jack W. Lavinder
(74) *Attorney, Agent, or Firm*—Myers Wolin, LLC

(57) ABSTRACT

A fastener for the suspension of a birdcage toy or the like has a first end terminating in a first loop, and a second end terminating in a second loop, each of the first and second loops terminating in a free end that allows for easy attachment of objects to the loops. An additional section is defined between the loop free ends to assist in preventing the free ends from deflecting outward, resulting in possible inadvertent detachment from the cage or retained object.

16 Claims, 5 Drawing Sheets

FASTENER

This is a continuation-in-part of U.S. application Ser. No. 29/229,612, filed May 10, 2005, which is incorporated by reference herein in its entirety.

FIELD OF THE INVENTION

The present invention relates to fasteners in general, and more particularly to a fastener for the suspension of a birdcage toy or the like.

BACKGROUND

Bird toys and other objects are usually suspended from cages by metal chains with metal clip ends that can be dangerous to birds. Such metal chains and clips have limited utility, are difficult to assemble, and tend to be heavy and expensive. There exists a need, therefore, for a fastener that is not dangerous to the birds, that is easy to use and manufacture and that is relatively inexpensive.

SUMMARY

A fastener for the suspension of a birdcage toy or the like has a first end terminating in a first loop, and a second end terminating in a second loop, with each loop preferably terminating in a free end that allows for easy attachment of objects to the loops. The free ends deflect inward to allow for easy attachment to a cage or a retained object. An additional section is defined between the loop free ends to assist in preventing the free ends from deflecting outward, resulting in possible inadvertent detachment from the cage or retained object. The fastener is preferably formed as a single, molded article.

DETAILED DESCRIPTION

Figure 1:
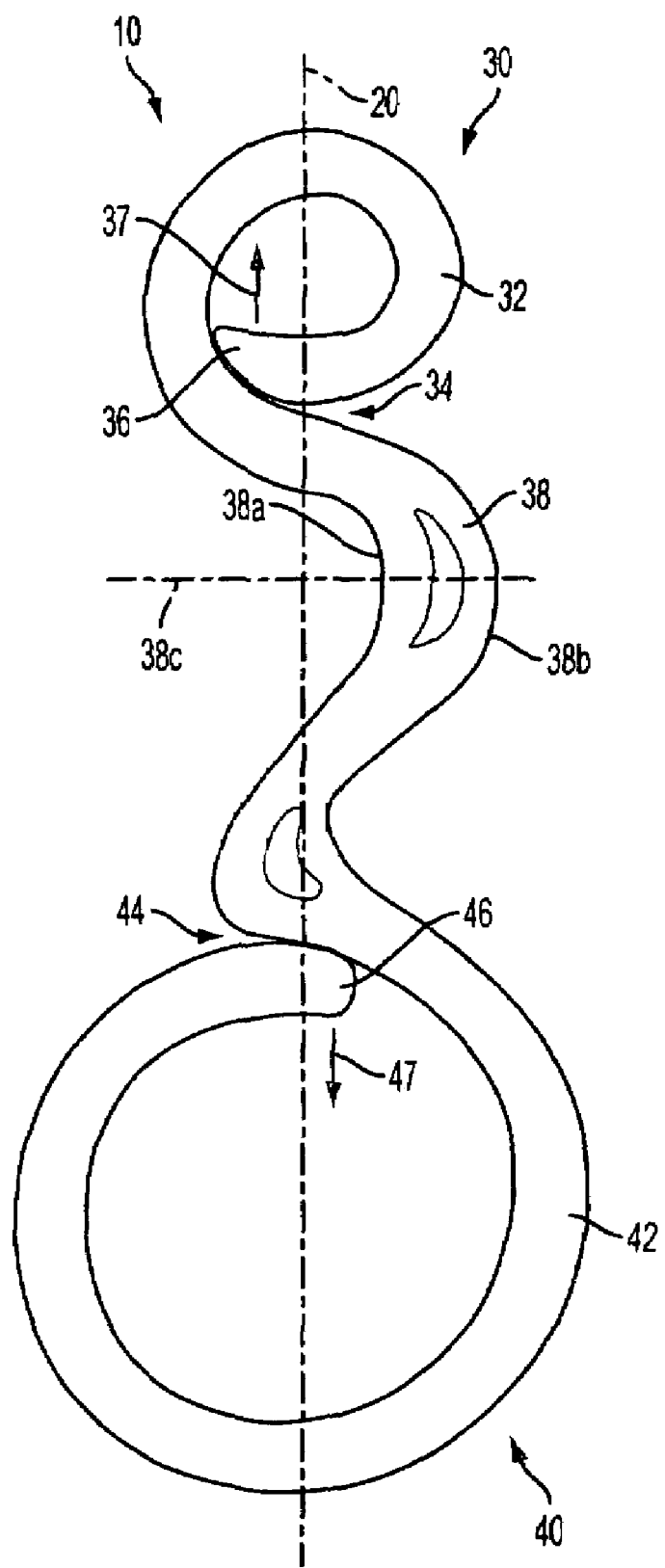
FIG. 1 illustrates a fastener in accordance with one embodiment of the present invention.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

FIG. 1 is a front elevation view of a fastener 10 in accordance with one embodiment of the present invention. Fastener 10 comprises a longitudinal axis 20, a first end 30, and a second end 40 opposite the first end 30. The first end 30 terminates in a first loop 32 having a beginning 34 and an end 36 that is preferably a free end, or an end that is unattached to the remainder of the loop 32. The second end 40 terminates in a second loop 42 having a beginning 44 and an end 46 that is also preferably a free end. It will be understood that while the ends 36, 46 are preferably free ends, they could also be releasably joined to their respective loops 32, 42.

Figure 2:
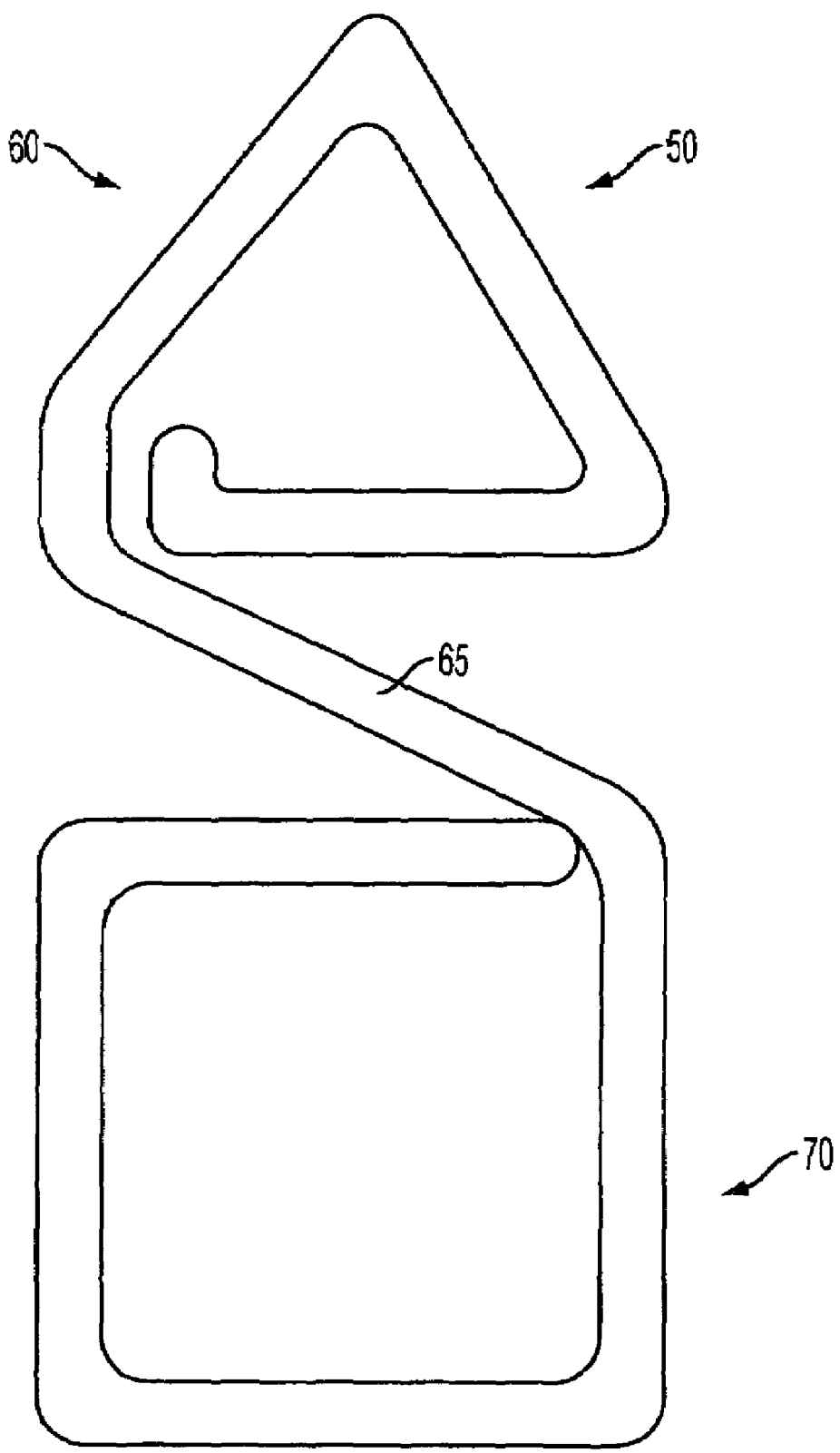
FIG. 2 illustrates an alternative embodiment of a fastener.

While FIG. 1 illustrates a first loop 30 that is smaller than the second loop 40, with each of the loops 30, 40 being generally circular in shape, it will be understood that the loops 30, 40 could each have a variety of structural characteristics. The loops 30, 40 could be of the same size, shape and cross-section, or they could differ in construction as desired. The loops 30, 40 could also be formed from various shapes that are not necessarily circular or curved in part or in whole, with non-limiting examples being a triangle, square, polygon or the like. FIG. 2 illustrates one such example of a fastener 50 having a first loop 60 in the shape of a triangle and a second loop 70 in the shape of a square, said loops 50, 60 being connected by a connecting section 65.

Figure 3:
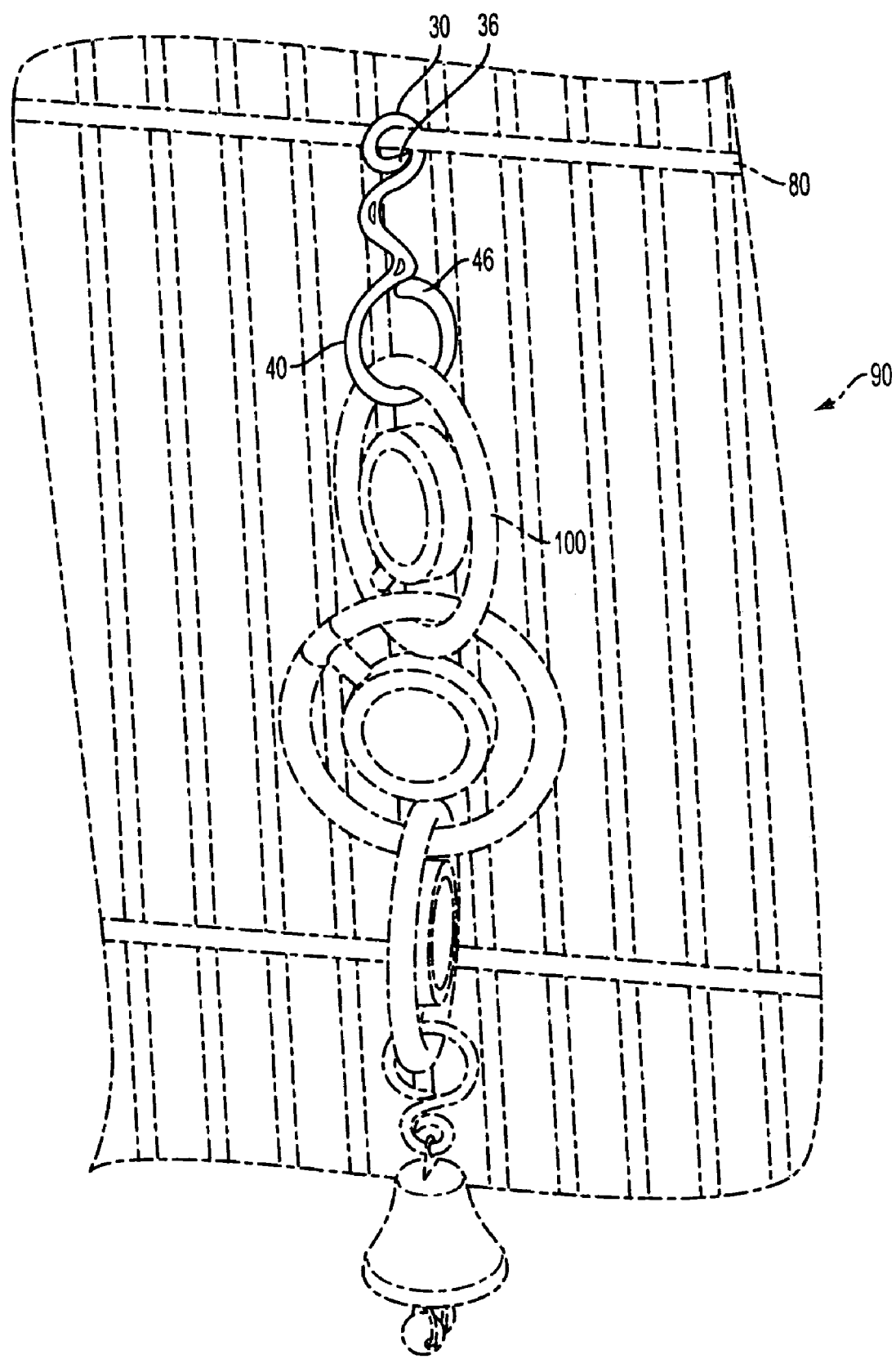
FIG. 3 illustrates the fastener of FIG. 1 in use.

Returning to FIG. 1, each of the respective loop free ends 36, 46 preferably overlaps each of the respective loop beginnings 34, 44 such that the ends 36, 46, are directed away from each other. The loops 32, 42 are also preferably resilient such that the respective free ends 36, 46 can deflect into the loops 32, 42 and away from each other in accordance with arrows 37, 47. This deflection enables a wire 80 on a bird cage 90 (FIG. 3) to be fitted inside the loop 30, for example, only by creating interference and using the resilience of the loop material to create an opening in the overlapped portion of the loop 30 near the loop free end 36. Thus, the wire 80 merely needs to be pressed against the loop free end 36 to cause the free end 36 to deflect in accordance with arrow 37 to allow the wire 80 to pass into the loop opening. Similarly, the other loop 40 can be threaded into an opening in another object, such as a hanging play device 100, by opening up the overlapped portion 46 as the surface surrounding the toy deflects the loop 40, thereby creating an opening.

Figure 4:
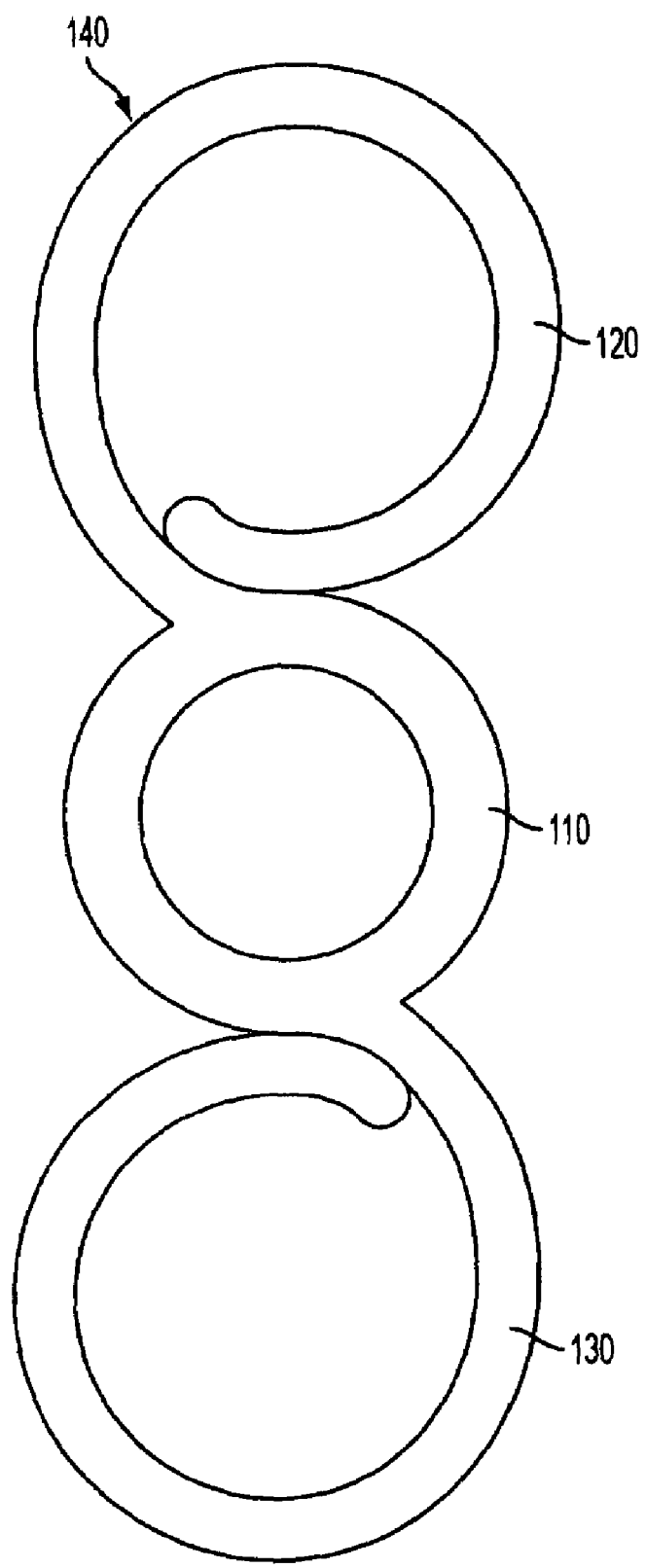
FIG. 4 illustrates an alternative embodiment of a fastener.
Figure 5:
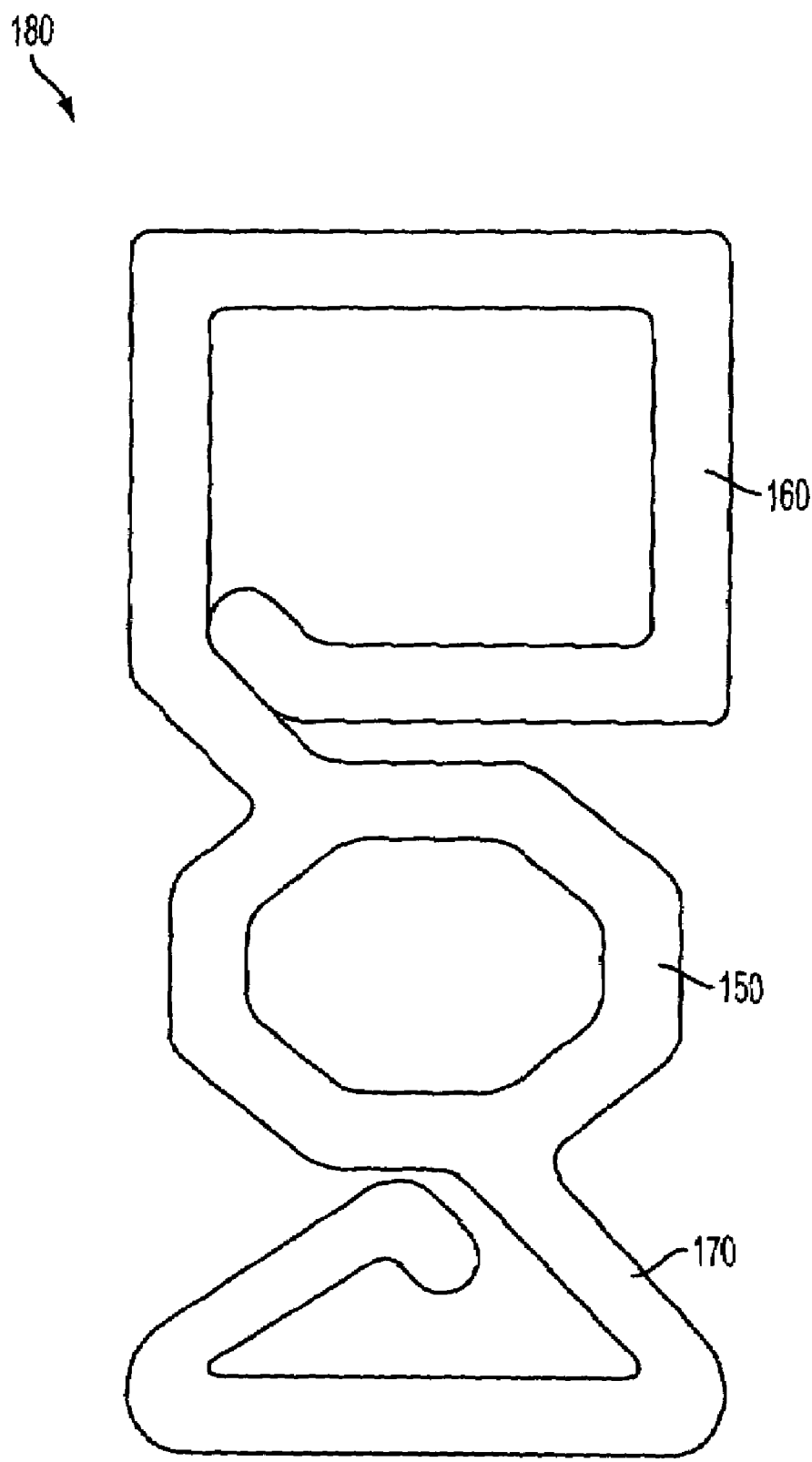
FIG. 5 illustrates an alternative embodiment of a fastener.

The fastener 10 preferably further comprises an additional section 38, shown in FIG. 1 as an arcuate section 38, defined between the first and second loops 30, 40, and more particularly between the loop beginnings 34, 44. Such additional section 38 assists in preventing the loop free ends 36, 46 from deflecting in a direction opposite to arrows 37, 47, resulting in possible inadvertent detachment from the cage or retained object. This might occur if, for example, a bird grabs the fastener 10 from the second loop 40 and lifts upward, causing the wire 80 (FIG. 3) to bear against the loop free end 37 which, in the embodiment of FIG. 1, causes the loop free end 37 to bear against the additional section 38 adjacent the loop beginning 34. This contact between the loop free end 36 and the additional section 38 prevents the loop free end 36 from overextending the region defined by the loop beginning 34, and thus, in the scenario mentioned above, releasing the wire 80 from the interior of the loop 30. While the additional section 38 of the embodiment of FIG. 1 is illustrated as an open arc defining a concave surface 38a and a convex surface 38b, a closed section 110, 150 may be formed between first loops 120, 160 and second loops 130, 170 as shown in the fasteners 140, 180 of FIGS. 4 and 5. Sections 38, 110, 150 may be rigid or resilient to allow for variation in spacing and flexibility between the first loops 30, 120, 160 and second loops 40, 130, 170 respectively. Furthermore, while it is preferable for the additional section to effectively function as a stop for each of the loop ends, it is contemplated that such additional section may be designed to function as a stop for only one free end, particularly if only one loop would be subject to inadvertent detachment.

Returning again to FIG. 1, the longitudinal axis 20 preferably defines a central axis of at least one, and preferably each loop 30, 40, which evenly distributes the weight forces between the central portions of each loop 30, 40, and maintains the fastener 10 in a generally vertical, upright and aligned orientation during use. To further support such an orientation, it is preferred if the additional section 38 has a bisecting axis 38c that is perpendicular to the longitudinal axis 20. However, the loops 30, 40 may be arranged as desired so that they are not aligned along the longitudinal axis 20 (not shown).

The fastener of the present invention is preferably formed of a resilient and durable material such as plastic or an elastomeric material that is not harmful to birds or other animals. A variety of materials will be acceptable depending on the environment and the nature of the objects being retained. In certain conditions, natural rubber, synthetic rubber, or a blend of natural rubber or synthetic rubber and a plurality of blending polymers may be preferred. In other conditions, m materials that are not as elastic may be preferred.

The fastener of the present invention, and in particular the loops, may also be formed in any shape or size or combinations thereof, and have cross-sections of any shape and thickness dimension (i.e., solid or hollow). In addition, while a fastener having a pair of loops is shown, more than two loops are also contemplated if it is desired to use the fastener to attach more than two objects. Furthermore, the fastener of the present invention is preferably formed as a single, one-piece molded object, although other constructions are contemplated.

The fastener of the present invention has been described as a birdcage attachment for use in a birdcage environment. However, it will be appreciated that the fastener can be used in a variety of situations and environments unrelated to use in cages, with animals, or with the suspension of toys or the like. For example, the fastener could be used to suspend clothing from a closet hanger rod. Other environments and uses are contemplated.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A fastener comprising:
   a) a longitudinal axis, a first end, a second end opposite the first end, and a connecting section defined between the first and second ends;
   b) the first end terminating in a first loop having a beginning and a free end;
   c) the second end terminating in a second loop having a beginning and a free ends the first and second loops having different sizes; and
   d) each of the respective loop free ends crossing the longitudinal axis adjacent their free ends and overlapping each of the respective loop beginnings in opposite directions.

2. A fastener in accordance with claim 1, wherein the connecting section separates the first and second loops along the longitudinal axis by a distance that is no greater than the combined length of the first and second loops measured along the longitudinal axis of the fastener.

3. A fastener in accordance with claim 1, wherein the connecting section is an arcuate section.

4. A fastener in accordance with claim 3, wherein the arcuate section is an open arcuate section that is convex in the direction of the free end of the second loop.

5. A fastener in accordance with claim 4, wherein the arcuate section is concave in the direction of the free end of the first loop.

6. A fastener in accordance with claim 1, wherein the connecting section is a closed arcuate section.

7. A fastener in accordance with claim 1, wherein the connecting section is defined between the first and second loop beginnings.

8. A fastener in accordance with claim 1, wherein the connecting section separates the first and second loops along the longitudinal axis by a distance that is no greater than the combined length of the first and second loops measured along the longitudinal axis of the fastener.

9. A fastener comprising:
   a) a longitudinal axis, a first end, a second end opposite the first end, and a connecting section defined between the first and second end;
   b) the first end terminating in a first loop having a beginning and a free end;
   c) the second end terminating in a second ioop having a beginning and a free end, the first and second loops having different shapes; and
   d) each of the respective loop free ends crossing the longitudinal axis adjacent their free ends and overlapping each of the respective loop beginnings in opposite directions.

10. A fastener in accordance with claim 1, wherein the loops are resilient such that the respective free ends deflect away from each other.

11. A fastener in accordance with claim 1, wherein the fastener further comprises a one-piece, molded plastic fastener.

12. A fastener in accordance with claim 1, wherein the longitudinal axis defines a central axis of at least one loop.

13. A fastener in accordance with claim 12, wherein the longitudinal axis defines a central axis of each loop.

14. A fastener comprising:
   a. a first loop, a second loop and a connecting section defined therebetween;
   b. each loop having a resilient free end that crosses a longitudinal axis of the fastener and deflects inwardly toward its respective loop, the resilient free ends deflecting in opposite directions, the first and second loops having different shapes; and
   c. wherein the connecting section prevents each free end from deflecting outwardly away from its respective loop.

15. A fastener in accordance with claim 14, wherein the connecting section has a shape that differs from at least one of the first and second loops.

16. A fastener in accordance with claim 14, wherein the connecting section has a shape that differs from at least one of the first and second loops.

* * * * *